(12) United States Patent  
Hahlbeck et al.

(10) Patent No.: US 8,113,986 B2  
(45) Date of Patent: Feb. 14, 2012

(54) FLEXIBLE PIN FOR HELICAL GEARS

(75) Inventors: Edwin C. Hahlbeck, Pewaukee, WI (US); Michael T. Chartre, Watertown, WI (US)

(73) Assignee: Clipper Windpower, Inc., Carpinteria, CA (US)

( * ) Notice: Subject to any disclaimer, the term of this patent is extended or adjusted under 35 U.S.C. 154(b) by 604 days.

(21) Appl. No.: 12/352,880

(22) Filed: Jan. 13, 2009

(65) Prior Publication Data

US 2009/0286645 A1 Nov. 19, 2009

Related U.S. Application Data

(60) Provisional application No. 61/127,592, filed on May 13, 2008.

(51) Int. Cl.  
*F16H 57/12* (2006.01)

(52) U.S. Cl. ......................................... 475/347

(58) Field of Classification Search .................. 475/346, 475/347  
See application file for complete search history.

(56) References Cited

U.S. PATENT DOCUMENTS

| | | | | |
|---|---|---|---|---|
| 3,011,365 A | * | 12/1961 | Stoeckicht | 475/335 |
| 4,700,583 A | * | 10/1987 | Hicks | 74/410 |
| 5,240,462 A | * | 8/1993 | Mochizuki et al. | 475/342 |
| 2008/0153657 A1 | | 6/2008 | Smook et al. | |
| 2008/0274849 A1 | | 11/2008 | Smook et al. | |

\* cited by examiner

*Primary Examiner* — Edwin A Young  
(74) *Attorney, Agent, or Firm* — Fay Sharpe LLP (57) ABSTRACT

A flexible pin for a helical gear system. A countering realignment equal and opposite to the misalignment caused by the overturning moment and other gear forces is created without adding components or wearing surfaces. On the pin elements, one or more different or varying cross sections with the principal axes of their sections non-vertically orientated utilize the tangential and radial forces to cause deflections in two planes to perfectly compensate for misalignment caused by helical gear forces, thus keeping the mesh aligned the same as when using spur gears and traditional flexpins.

16 Claims, 14 Drawing Sheets

FLEXIBLE PIN FOR HELICAL GEARS

This application claims priority from provisional Ser. No. 61/127,592 which was filed on May 13, 2008. The subject matter of the provisional application is incorporated herein by reference in its entirety.

BACKGROUND OF THE INVENTION

1. Field of the Invention

This invention relates in general to gear systems and, more particularly, to a flexible pin for a helical gear system.

2. Description of the Prior Art

A special form of cantilevered support for gear elements contains a sleeve element concentric to the mounting pin that deflects in a manner that the outside of the sleeve remains parallel to the system axis. This is commonly referred to as a "flex-pin". Such a flexpin may include an inner pin that is secured to a wall or other member, thus cantilevering the inner pin from the wall or other member, and a sleeve that is cantilevered from the opposite end of the inner pin and extends back over the inner pin, thus providing a double cantilever.

In addition to parallel deflection, these devices have an engineered spring rate to assist in equalizing load in multi-gear, split-power systems, including planetary systems. The invention disclosed in U.S. Pat. No. 3,303,713, to R. J. Hicks has significant application in heavy-duty transmissions, especially when increasing power density by using four or more planets in an epicyclical configuration. These systems normally use spur gears. With such gears, tooth contact is primarily rolling, with sliding occurring during engagement and disengagement.

In contrast helical gears are cylindrical shaped gears with helicoid teeth. Helical gears operate with less noise and vibration than spur gears. At any time, the load on helical gears is distributed over several teeth, resulting in reduced wear. Due to their angular cut, teeth meshing results in thrust loads along the gear shaft. Therefore, while helical gears have higher density and smoother operation, they generate an overturning moment in the radial plane 90° to the tangential loads that the flex-pin is designed to accommodate. With the conventional flex-pin, this moment would lead to a rotation of the gear in the radial plane that would cause tooth misalignment.

Figure 1:
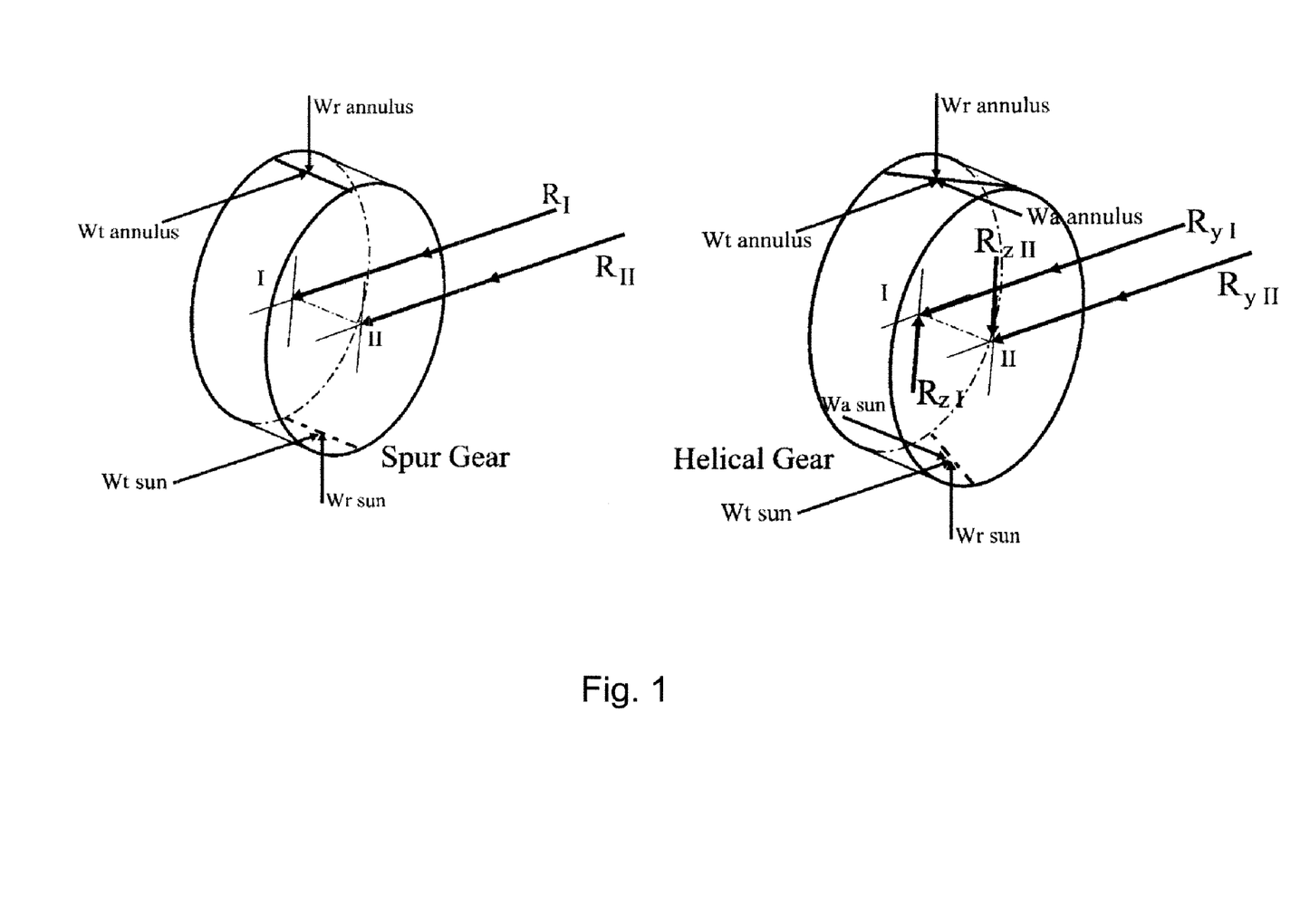
FIG. 1 is a force comparison in planetary systems, spur and helical.

The differences in gear forces are illustrated in FIG. 1. In this Figure a planet gear is shown, which is part of an epicyclic gearing system. The 'epicyclic' arrangement consists of a ring of planet gears mounted on a planet carrier and meshing with a sun gear on the inside and an annulus gear on the outside. The sun and planets are external gears and the annulus is an internal gear as its teeth are on the inside. Usually either the annulus or planet carrier are held fixed, but the gear ratio is larger if the annulus is fixed.

The epicyclic arrangement allows the load to be shared out between the planets, reducing the load at any one gear interface. As can be seen in FIG. 1 there are different forces with radial (r), tangential (t) and axial (a) components acting on the planet gears in such an arrangement. For the helical gears, the axial forces result in an overturning moment.

The overturning helical gear moment can be addressed by installing reaction rings, but in practice those will encounter stress and can wear. This is particularly risky since wear particles in the area of gears and bearings are undesirable at any rate of occurrence.

Therefore, it is an object of the present invention to provide a solution to the overturning helical gear moment problem without adding components or wearing surfaces.

SUMMARY OF THE INVENTION

According to the present invention, a correcting realignment equal and opposite to the misalignment caused by the overturning moment and other gear forces is created without adding components or wearing surfaces. Such, the invention solves the problem described above.

According to the invention, the pins exhibit one or more different or varying cross sections with the principal axes of their sections non-vertically orientated utilize the tangential and radial forces to cause deflections in two planes to perfectly compensate for misalignment caused by helical gear forces, thus keeping the mesh aligned the same as when using spur gears and traditional flexpins. Such pin elements show different stiffness in different directions as they are shaped non-isotropic and have different area moments of inertia along their axes.

Additionally, tangential alignment can be adjusted independently of radial alignment by varying the rotational orientation of the pin in its bore. Radial alignment is adjusted by modifications to the stiffness of the mounting component or carrier thus effecting the alignment of the pins mounting bores in the radial plane. Stiffening plates mounted to the mounting component or carrier are used to adjust the section properties. These plates control the misalignment of the pin mounting bores of the carrier in the radial plane.

The invention has the advantage of allowing application of flexible pins to helical gears.

The invention has the advantage of being able to compensate for undesirable deflections of the components in which the pins mount.

The invention has the advantage of allowing adjustment of the alignment to compensate for deviations from predicted and actual system deflections.

The invention has the advantage that helical gears carry higher loads and can be quiet and free of vibration.

The invention has the further advantage that it can be applied to heavy-duty transmissions where flexible pins reduce weight and cost plus using helical gears to achieve quiet running and further weight and size reduction.

BRIEF DESCRIPTION OF THE DRAWINGS

The invention will be described in detail with reference to the drawings in which.

DESCRIPTION OF THE PREFERRED EMBODIMENTS

As seen in FIG. 1, a spur planet gear in an epicyclical gear system has the usual tangential forces Wt_annulus and Wt_sun respectively.

The total tangential force is then given as:

$$W_t = W_{t\_annulus} + W_{t\_sun} \quad \text{(equation 1)}$$

The system also has the usual radial forces $W_{r\_annulus}$ and $W_{r\_sun}$ respectively. The total radial force is typically zero is given as:

$$W_r = W_{r\_sun} - W_{r\_annulus} \quad \text{(equation 2)}$$

The flex pin accommodates the tangential forces in a parallel deflection of the pin and sleeve arrangement. This is accomplished by compensating for the misalignment caused by the cantilever at one end with the cantilever at the other.

The deflection in the ordinary flex pin setup, designated here as $\Delta_y$ and $\Delta_z$ are, per classic mechanics (beam theory and beam deflection formulas):

$$\Delta_y = \frac{W_t \cdot l^3}{12 \cdot E \cdot I_{y-y}} \quad \text{(equation 3)}$$

Figure 2:
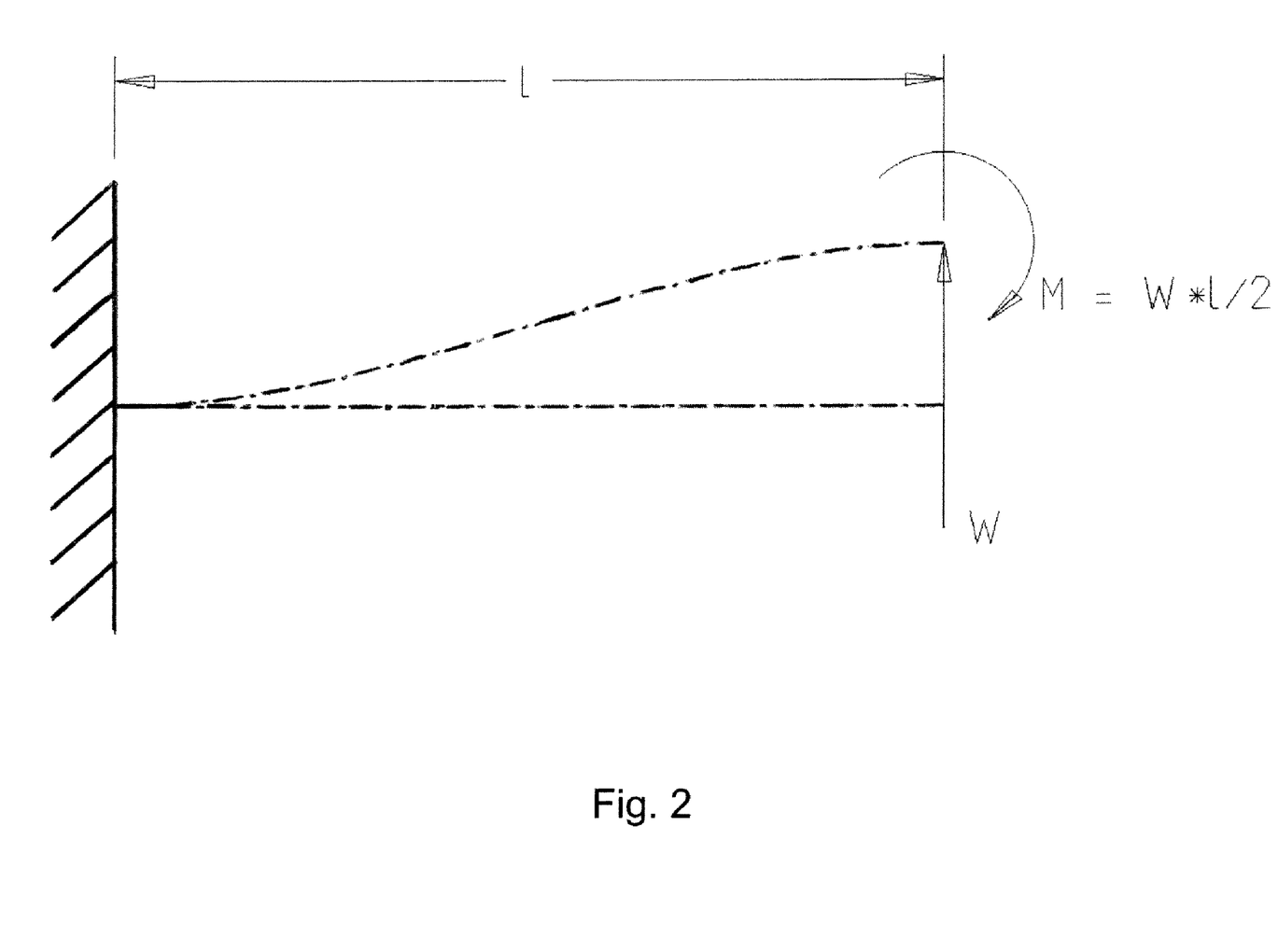
FIG. 2 is a diagram of a simple cantilevered beam with an end slope of zero

And:

$$\Delta_z = \frac{W_r \cdot l^3}{12 \cdot E \cdot I_{z-z}} \quad \text{(equation 4)}$$

wherein $I_{y-y}$ is the second moment of area or the area moment of inertia in the y-direction and $I_{z-z}$ is the second moment of area or the area moment of inertia in the z-direction and the slope at the free end of the beam is zero (maintaining tooth alignment). This is shown in FIG. 2.

Figure 3:
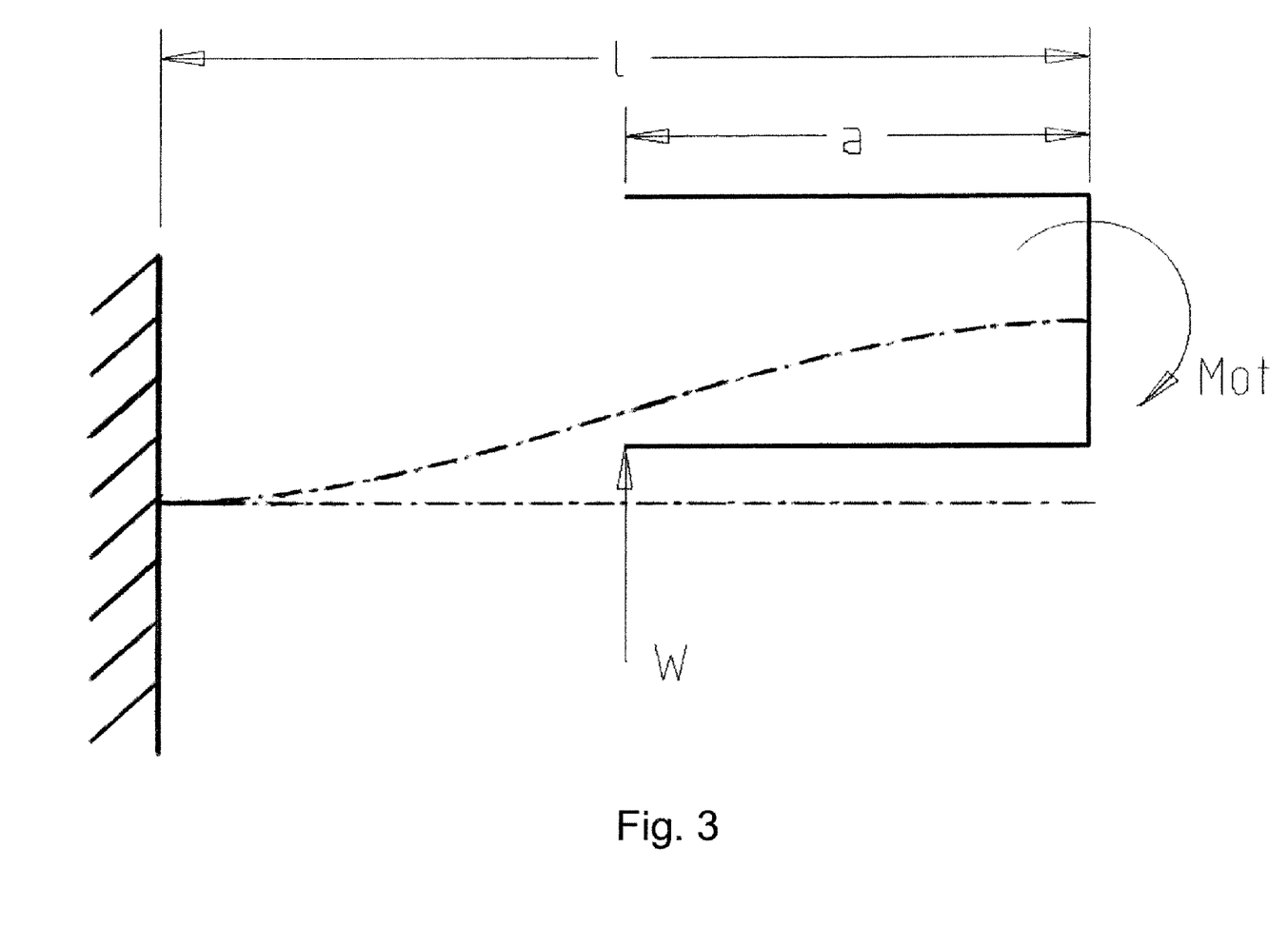
FIG. 3 is a diagram of simple beam with a double cantilever and an end slope of zero

If you assume the sleeve is sufficiently rigid, the same system can be represented as a double cantilever as shown in FIG. 3.

In this system, the following equations must be satisfied for the slope at the end of the beam to be equal to zero.

$$a = \frac{l}{2} - \frac{Mot_y}{W_r} \quad \text{(equation 5)}$$

And:

$$a = \frac{l}{2} - \frac{Mot_z}{W_t} \quad \text{(equation 6)}$$

Figure 4:
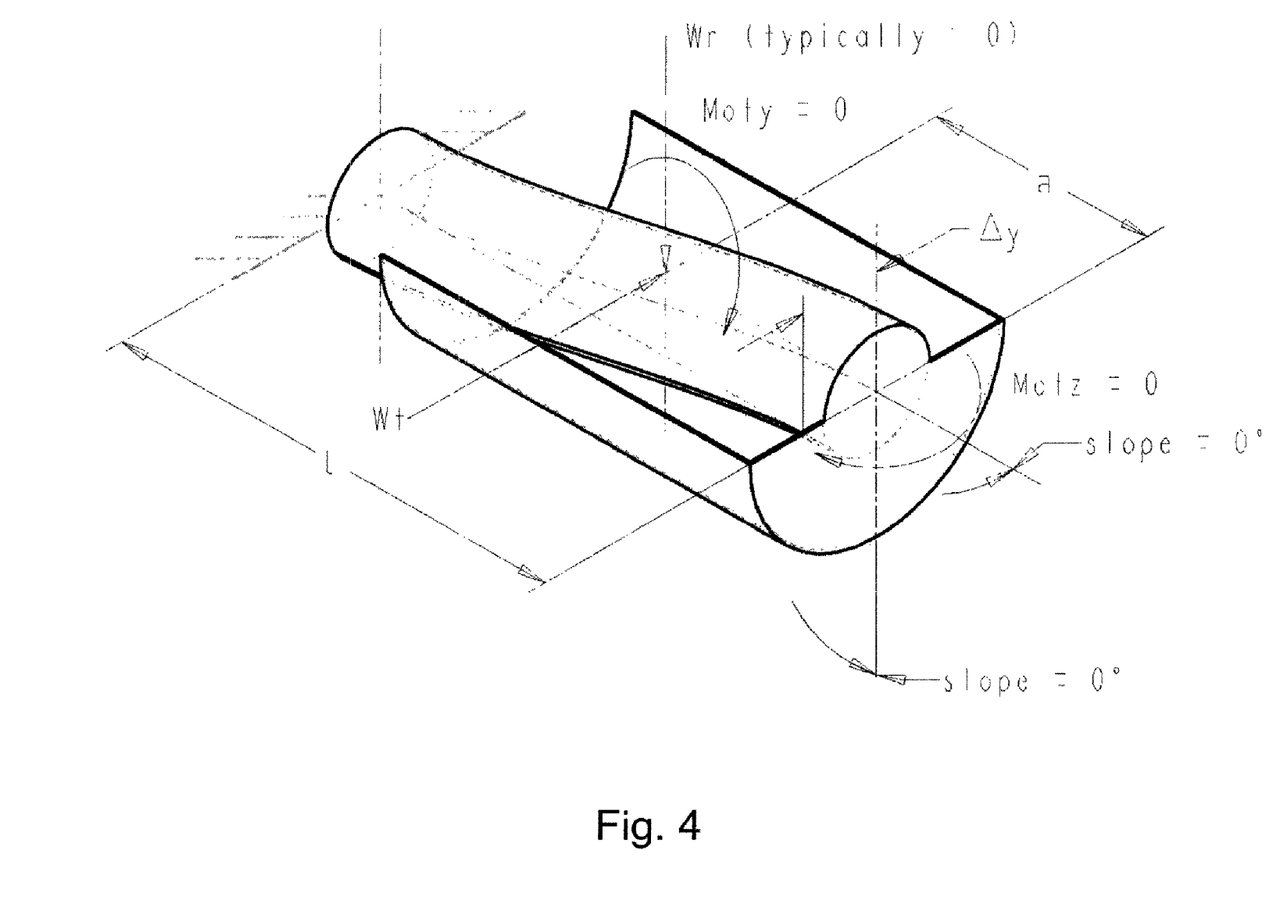
FIG. 4 is a diagram of spur gear forces on a traditional flex pin resulting in parallel deflection.

With spur gears, ordinarily, $W_r=0.0$, $Mot_y=0.0$, $Mot_z=0.0$ and for symmetrical pins $I_{y-y}=I_{z-z}$. Thus, when $a=l/2$, $\Delta_z=0$ and tooth alignment is maintained since the slope at the end of the pin, and thus in the sleeve is zero. This is shown below in FIG. 4.

Figure 5:
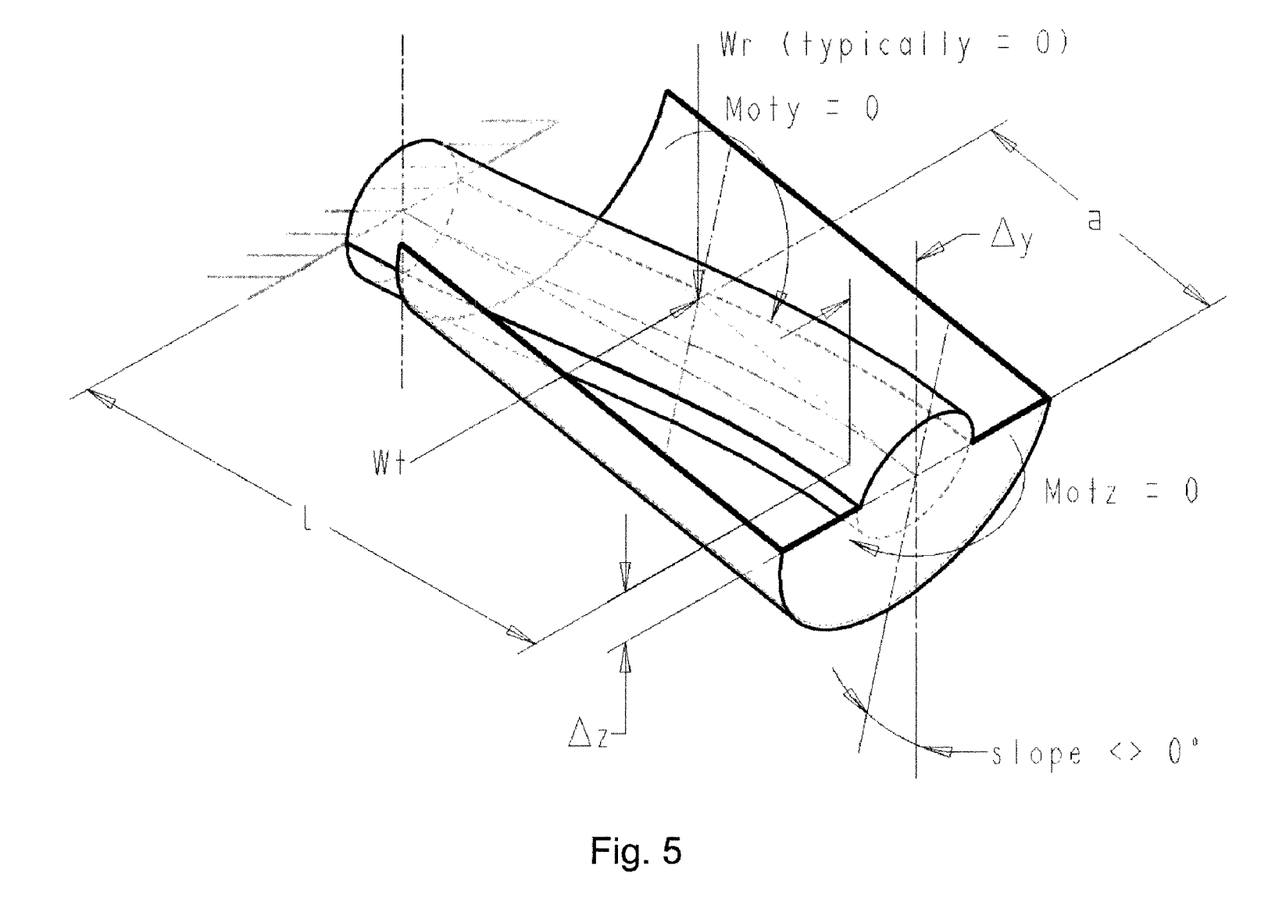
FIG. 5 is a diagram of helical gear forces acting on a traditional flex pin resulting non-parallel deflection

In contrast, for helical gears $Mot_y$ is not zero ($Mot_y \neq 0$) and thus there is a resulting deflection in the z-direction. This can be seen in FIG. 5. A helical planet gear in a epicyclical gear system has the same forces as the spur gear with the addition of an overturning moment. The overturning moment, $Mot_y$, is in the plane normal to $W_t$ and deflection in this radial plane will cause tooth misalignment between the planet gears and the sun gear and the annulus respectively. This is because the equations for 'a' cannot be satisfied. Because $Mot_z=0$, $a=l/2$ must be true. If $W_r=0$, $Mot_y/W_r$ is infinite, and if $W_r$ is not zero ($W_r \neq 0$) then $a=l/2$ cannot be true, thus a traditional flexpin cannot correct for this effect.

According to the invention, one changes $I_{z-z}$. In this invention, one changes $I_{z-z}$ by altering the normally symmetrical pin configuration so that $I_{z-z} \neq I_{y-y}$. This asymmetry creates a principal axis in the section. The principal axis is oriented non-vertically in such a way as to induce a radial deflection and slope misalignment in the z direction when tangential loads are applied in the y direction.

Figure 6:
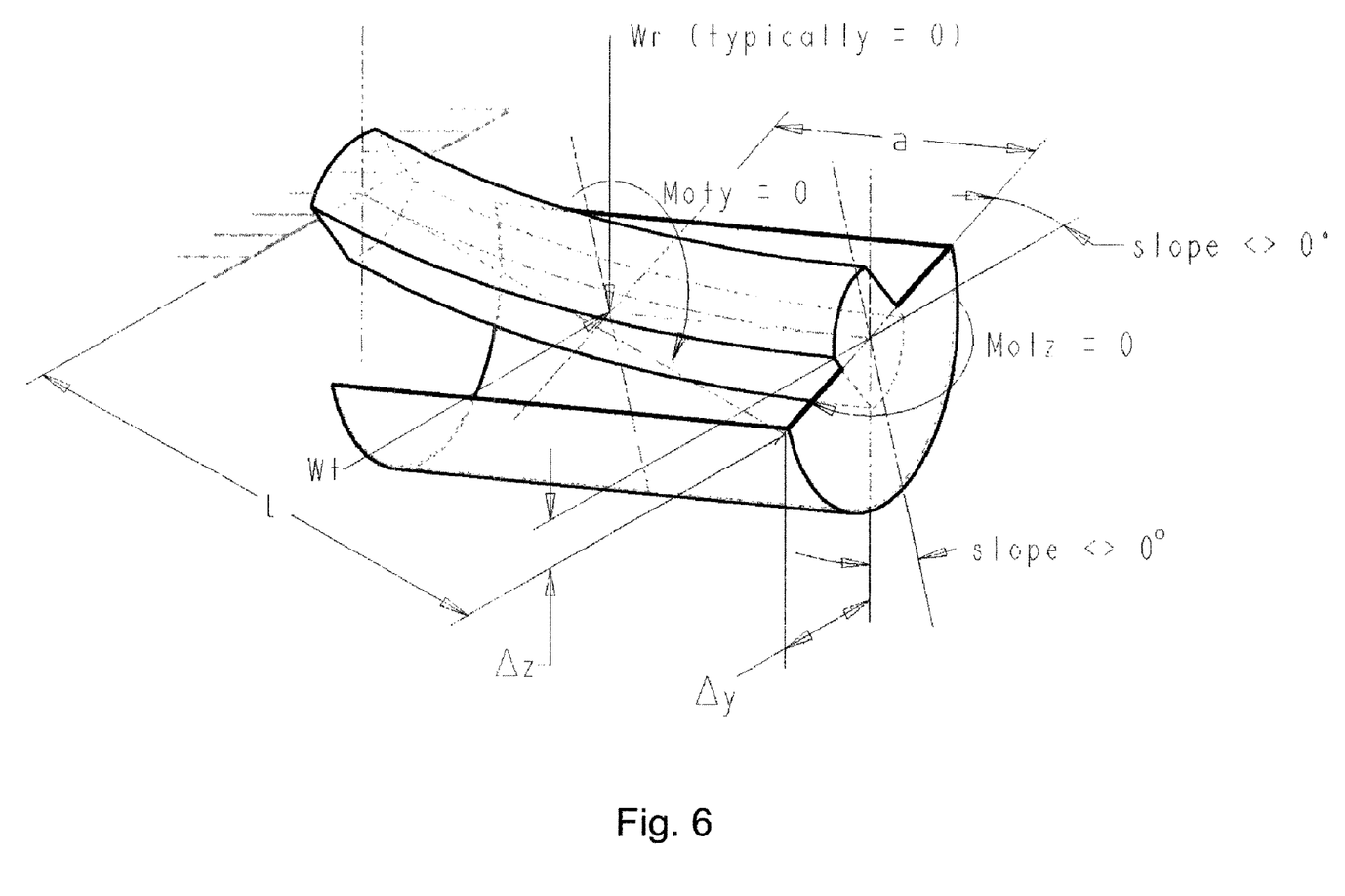
FIG. 6 is a diagram of spur-gear forces on an asymmetrical flex pin resulting in non-parallel deflection

This effect is seen in the following FIG. 6 where a singular force $W_t$ is reacted by a non-symmetrical pin carrying a spur gear. Due to the non vertical orientation of the section principal axis the deflection is seen in both y and z directions, in contrast to the deflection of a symmetrical flex-pin with a spur gear in FIG. 2. Due to difference in $I_{z-z}$ and $I_{y-y}$ allowing an angular orientation of the section principal axis, the pin deflects on an angle, as illustrated in FIG. 6.

Figure 7:
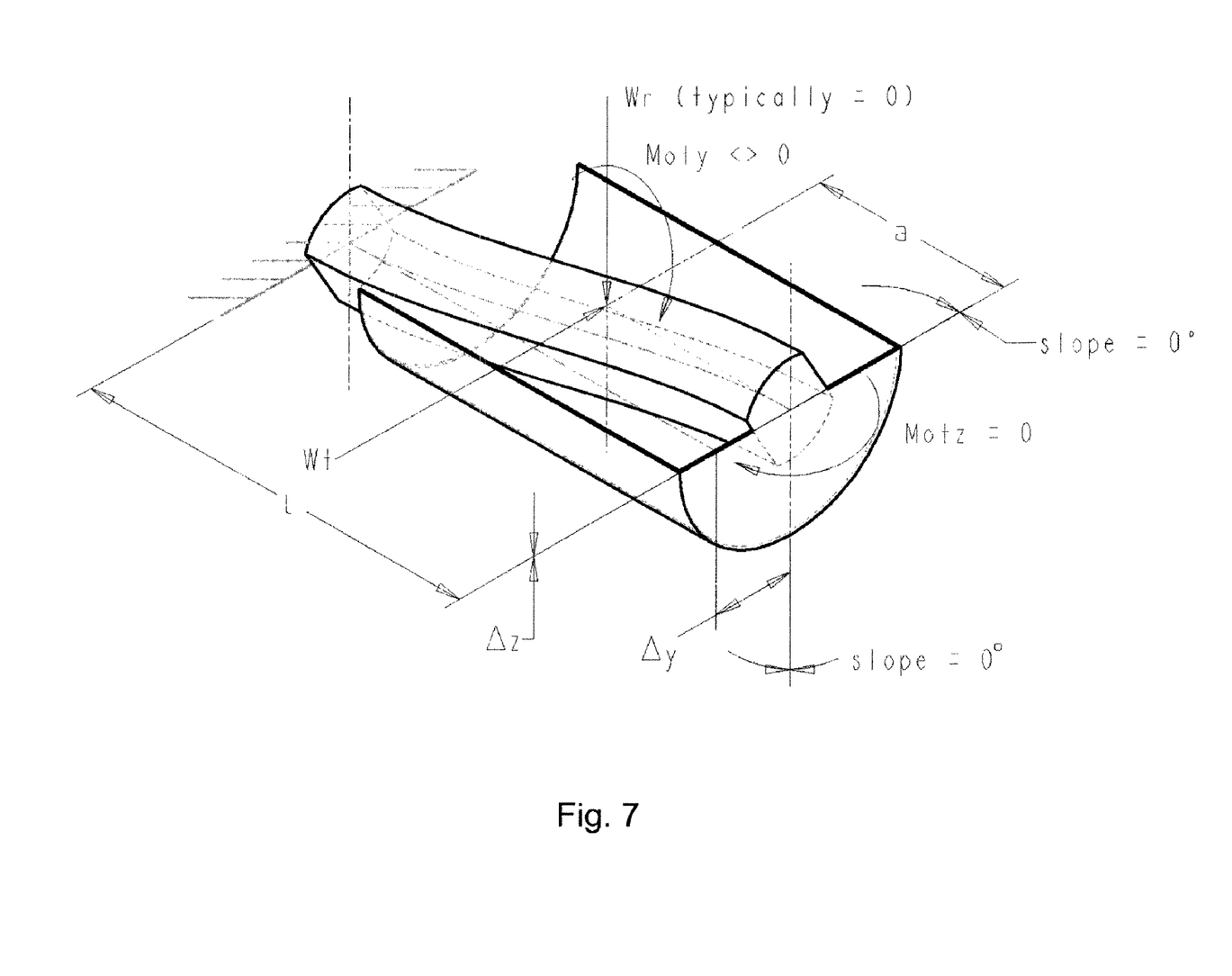
FIG. 7 is a diagram of helical gear forces on a asymmetrical flex pin resulting in parallel deflection

As explained above, helical gears, mounted on flexpins experience a moment $Mot_y$ about the y axis (in the radial plane), due to the forces resulting from the interaction of helical gears in contrast to spur gears. According to the invention, it is made use of the fact that there is a suitable y-direction force, (and potentially a z direction force), which in conjunction with the orientation of the section principal axes causes deflections and slopes out of the tangential plane which would counter-act or minimize deflection $\Delta z$ and cancel out the slope misalignments that would be otherwise be caused by the overturning moment about the y axis. This is can be seen in FIG. 7.

Equations 3, 4, 5, & 6 can be converted to the section principal axis coordinate system. The equations then become as follows:

$$\Delta_{p2} = \frac{(W_t \cdot \cos(\theta) + W_r \cdot \sin(\theta)) \cdot l^3}{12 \cdot E \cdot I_{p2-p2}} \quad \text{(equation 7)}$$

And:

$$\Delta_{p1} = \frac{(W_t \cdot \sin(\theta) + W_r \cdot \cos(\theta)) \cdot l^3}{12 \cdot E \cdot I_{p1-p1}} \quad \text{(equation 8)}$$

In this system, the following equations must be satisfied for the slope at the end of the beam to be equal to zero.

$$a = \frac{l}{2} - \frac{Mot_y \cdot \sin(\theta) + Mot_z \cdot \cos(\theta)}{W_r \cdot \sin(\theta) + W_t \cdot \cos(\theta)} \quad \text{(equation 9)}$$

And:

$$a = \frac{l}{2} - \frac{Mot_z \cdot \sin(\theta) + Mot_y \cdot \cos(\theta)}{W_t \cdot \sin(\theta) + W_r \cdot \cos(\theta)} \quad \text{(equation 10)}$$

Figure 8:
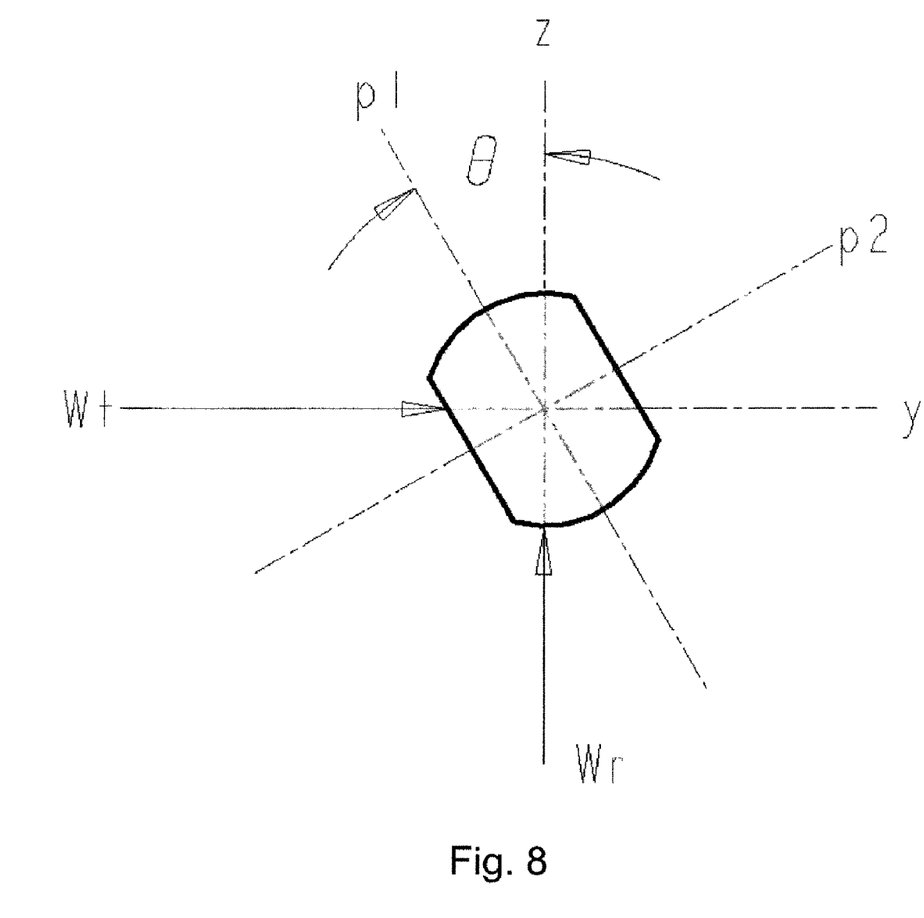
FIG. 8 is a diagram of a cross section of a asymmetrical flex pin showing principal axis orientation

This Coordinate systems are shown in FIG. 8

Because there is now a force and moment component in the first and second principal orientations, a solution to maintain slopes of zero in these planes can be found by adjusting the variables a, $\theta$, $I_{p1-p1}$ and $I_{p2-p2}$.

The force $W_t$ can be made more effective in countering the slope misalignments caused by $Mot_y$. By changing the orientation of the principal section axis in the opposite direction on the other side of the pin, the cantilevers on both sides of $W_t$ cause tipping of the sleeve in the same direction. This can be scene in FIG. 9.

Figure 10:
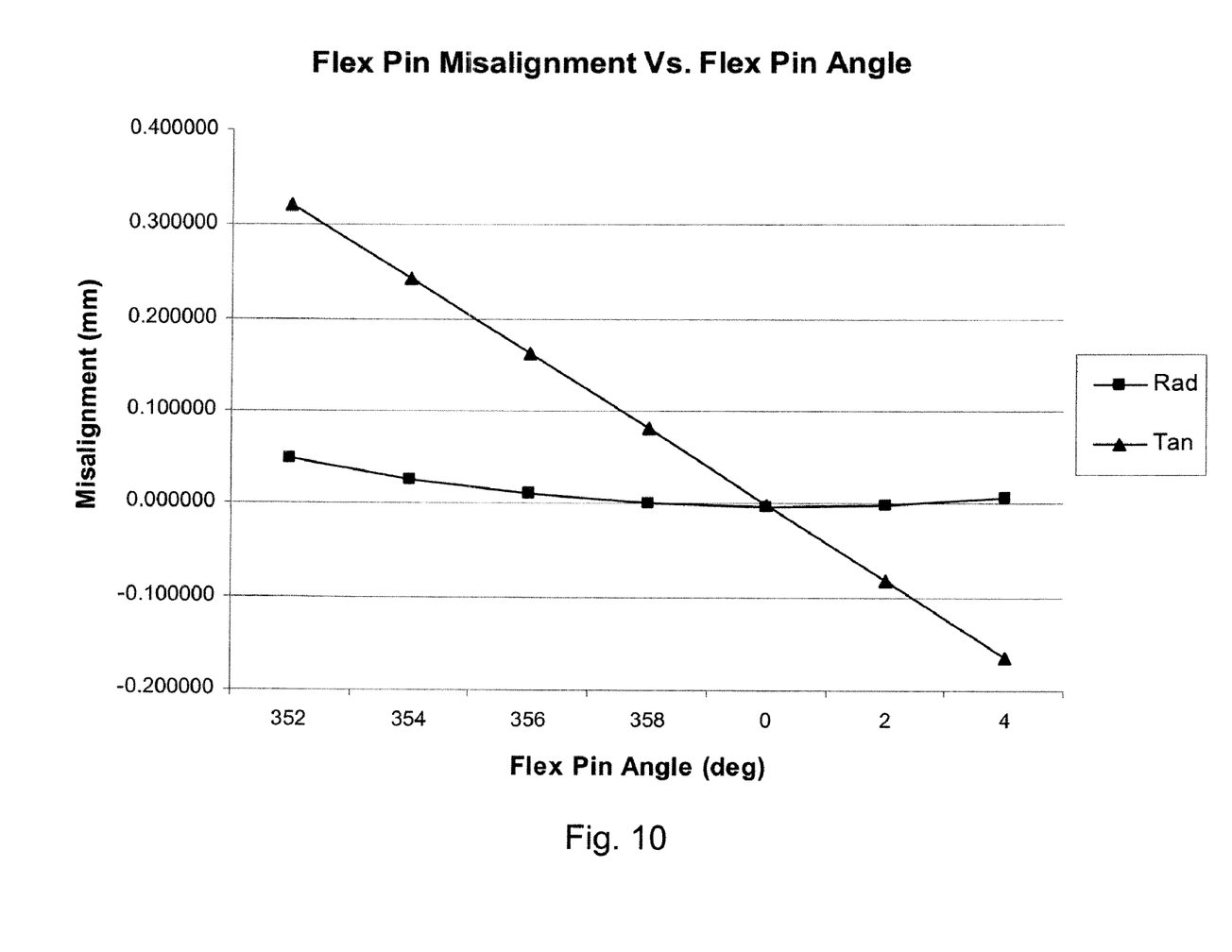
FIG. 10 is a diagram showing typical effects of pin rotation on tangential and radial alignment for a flexpin two different or varying cross sections
Figure 11A:
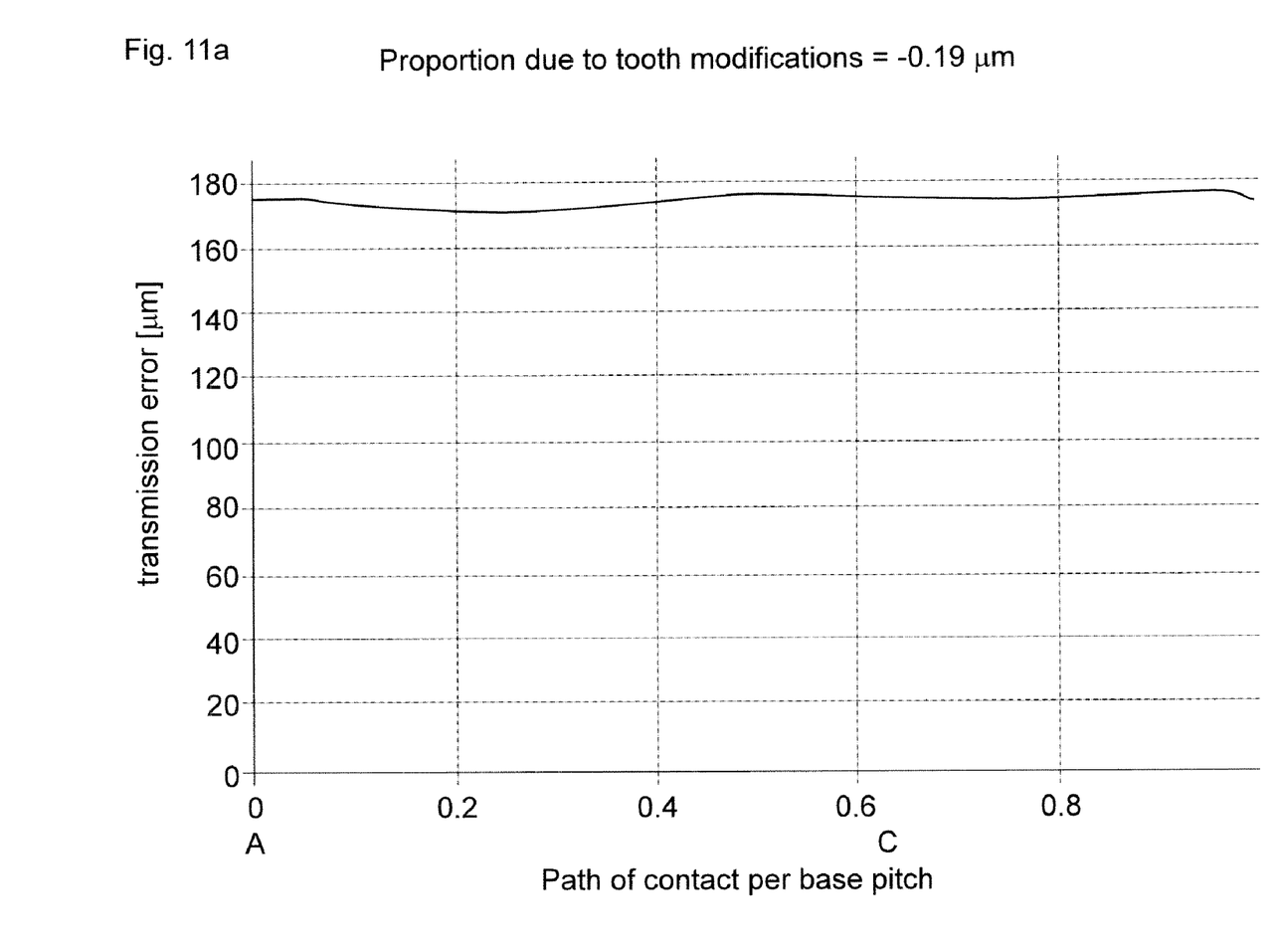
FIG. 11 is a comparison of mesh error of helical and spur gears of the same proportions.
Figure 11B:
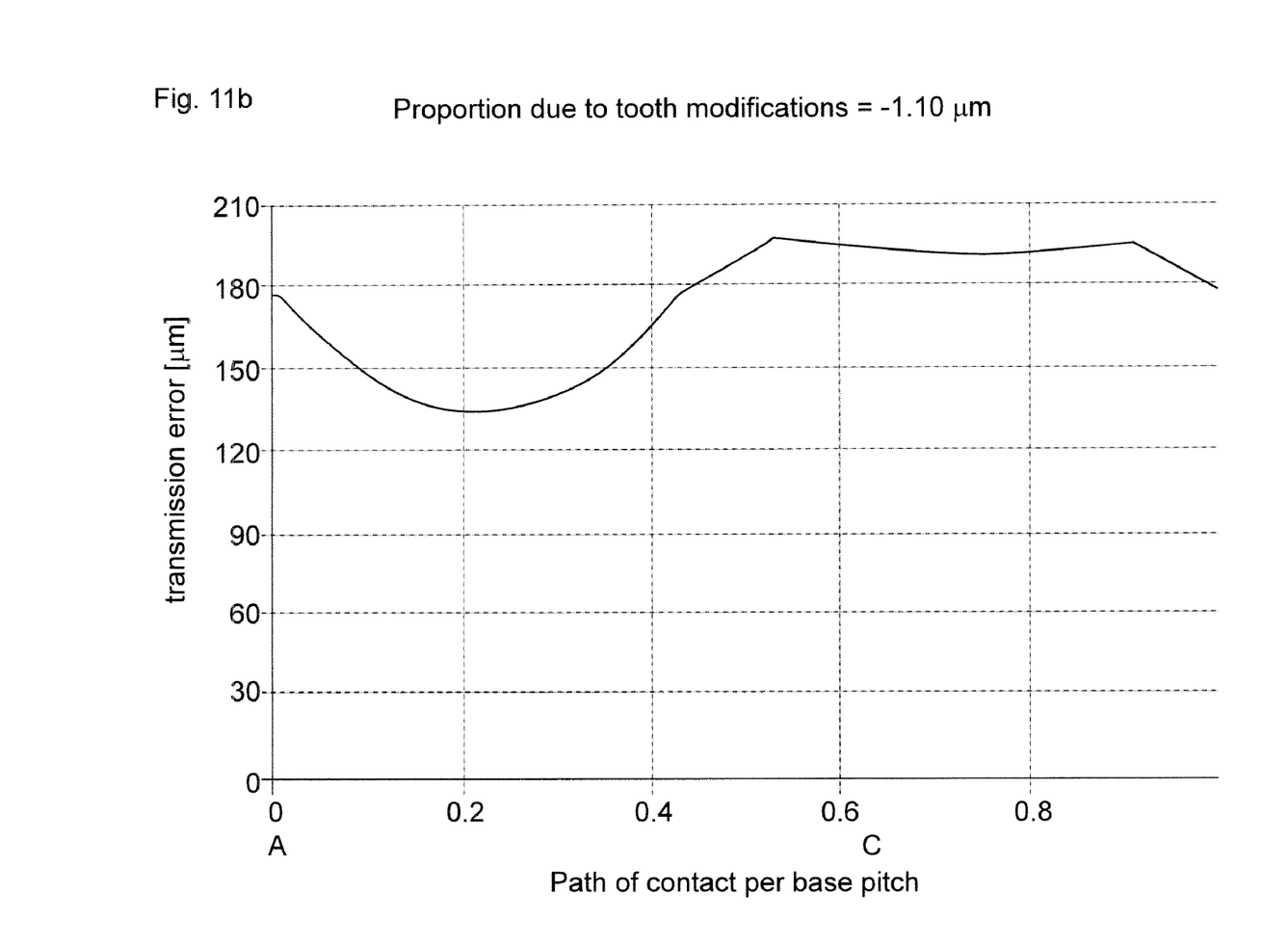
Figure 11C:
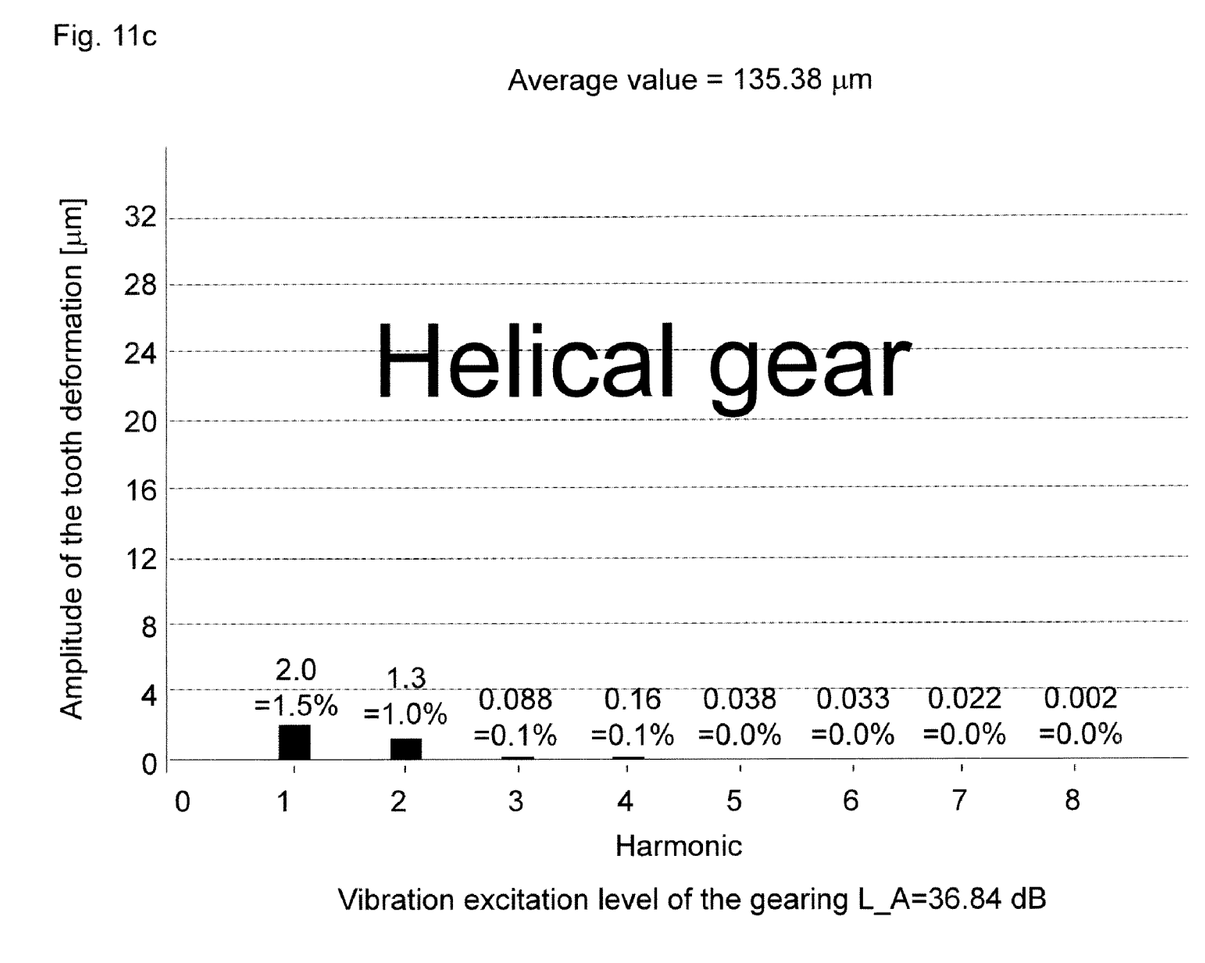
Figure 11D:
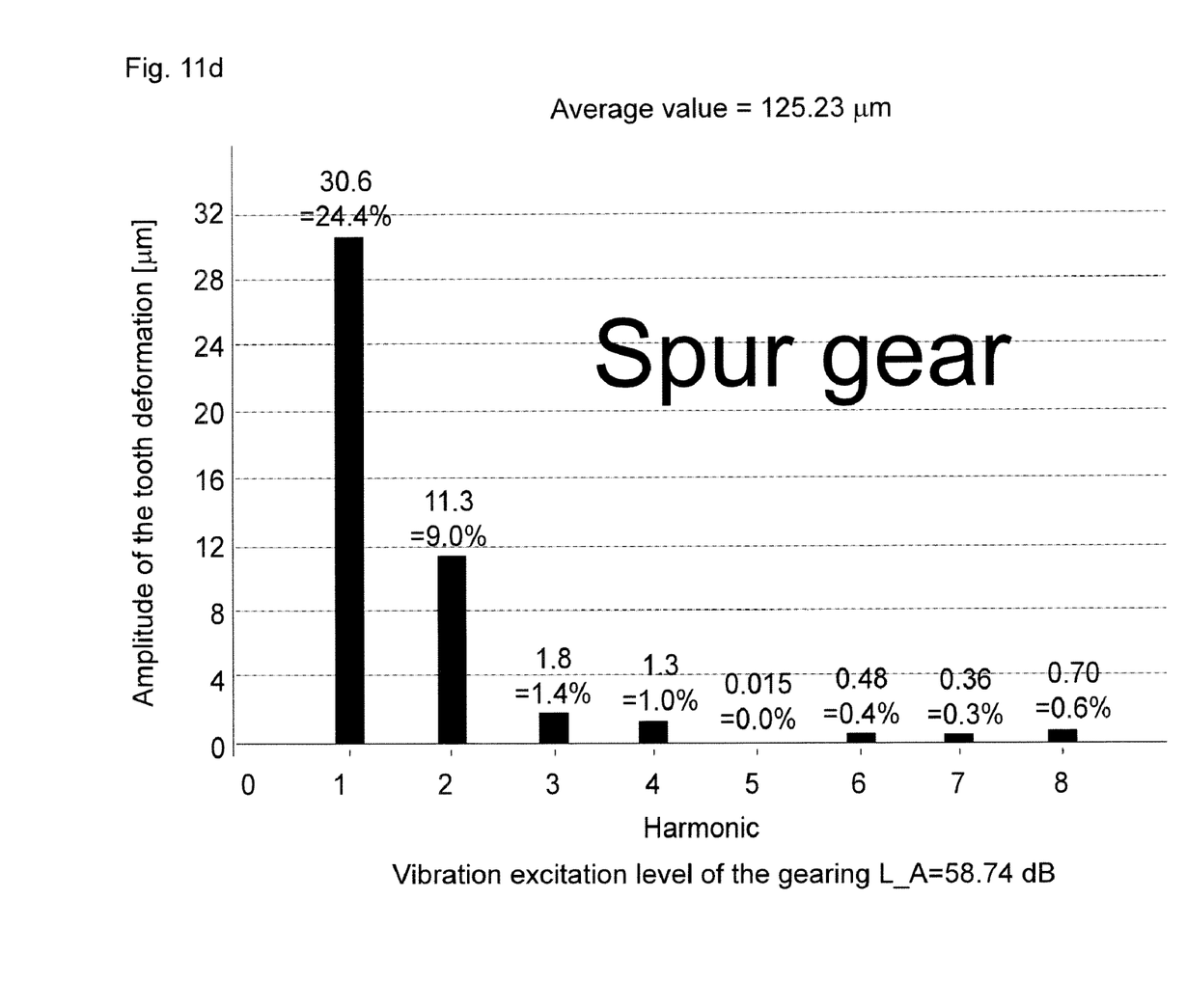

Depending on the specific loads of the gearing, this solution, or a variant of it where the section orientations vary across the length of the pin is desirable or required. This solution has an added benefit of being tunable after manufacturing. A properly designed flexpin of this type can be tuned for slope misalignments across the face in the tangential plane. This is accomplished by rotating the overall angular orientation of the pin in its mounting bore. Rotation of the pin clockwise and counterclockwise will cause an tangential alignment corrections in the opposite directions. These changes to tangential alignment are magnitudes more than the resulting changes to radial plane alignment. If the pin is designed properly, a plot of slope alignments across the gear face width in the tangential and radial planed vs pin orientation reveals that the plotted radial alignment curve has a zone where the slope is horizontal. In this same zone, the tangential alignment is going from large positive misalignment to negative. In this zone, large adjustments to tangential alignment can be made while not changing the radial alignment. This is scene in FIG. 10.

If adjustments to the radial alignment of the gear are found to be required after manufacturing, these can be handled independently of the tangential alignment by modifying the section properties of the pin mounting member such that its resistance to allowing the pin to tip in the radial plane is altered to provide more or less tipping. This is accomplished by using exchangeable stiffeners, or physically altering the mounting member itself.

The invention therefore teaches to model the flex-pin arrangement in a way, such that the area moments of inertia of the arrangements under consideration of the overturning moments or forces resulting from the helical gears interactions result in a compensation of the deflections and slopes in a direction, which would lead to tooth misalignment. The flex-pin arrangements are therefore build non-symmetrical with non vertically orientated principal axes, in order to obtain flex-pins with different flexural properties in different directions.

In the above examples one sees only the influence of the control pin of the flex pin assembly. For the y axis, the pin and sleeve properties are adjusted, or turned, so that their counter acting deflection directions are equal and opposite keeping the final gear mounting axis parallel to the system axis. Since the deflection includes the pin, sleeve and mounting surfaces, all must be included in the component tuning. While this can be done with classical mechanics, it becomes very complex when including mounting surfaces, which are typically part of a complex geometrical shape. Most often computer simulation, such as finite element analysis (FEA) is used to predict and iterate the design or advance desired results.

This same approach is possible for pins with asymmetrical geometry. Since all members of the flex-pin assembly contribute to the resulting moments of inertia in the z and y direction respectively and therefore contribute to the deflection behavior, both the pin and mounting component can be modified to achieve desired results. Most often, the pin above is modified to simplify the manufacturing of the components.

Refer to FIG. 11. This is a design for a spur gear and associated flex pin that provides parallel deflection for a given mounting system. Using accepted procedures for gear-rating optimization one can determine the torque capacity, W. The resulting deflection curve is illustrated in FIG. 11.

Figure 9:
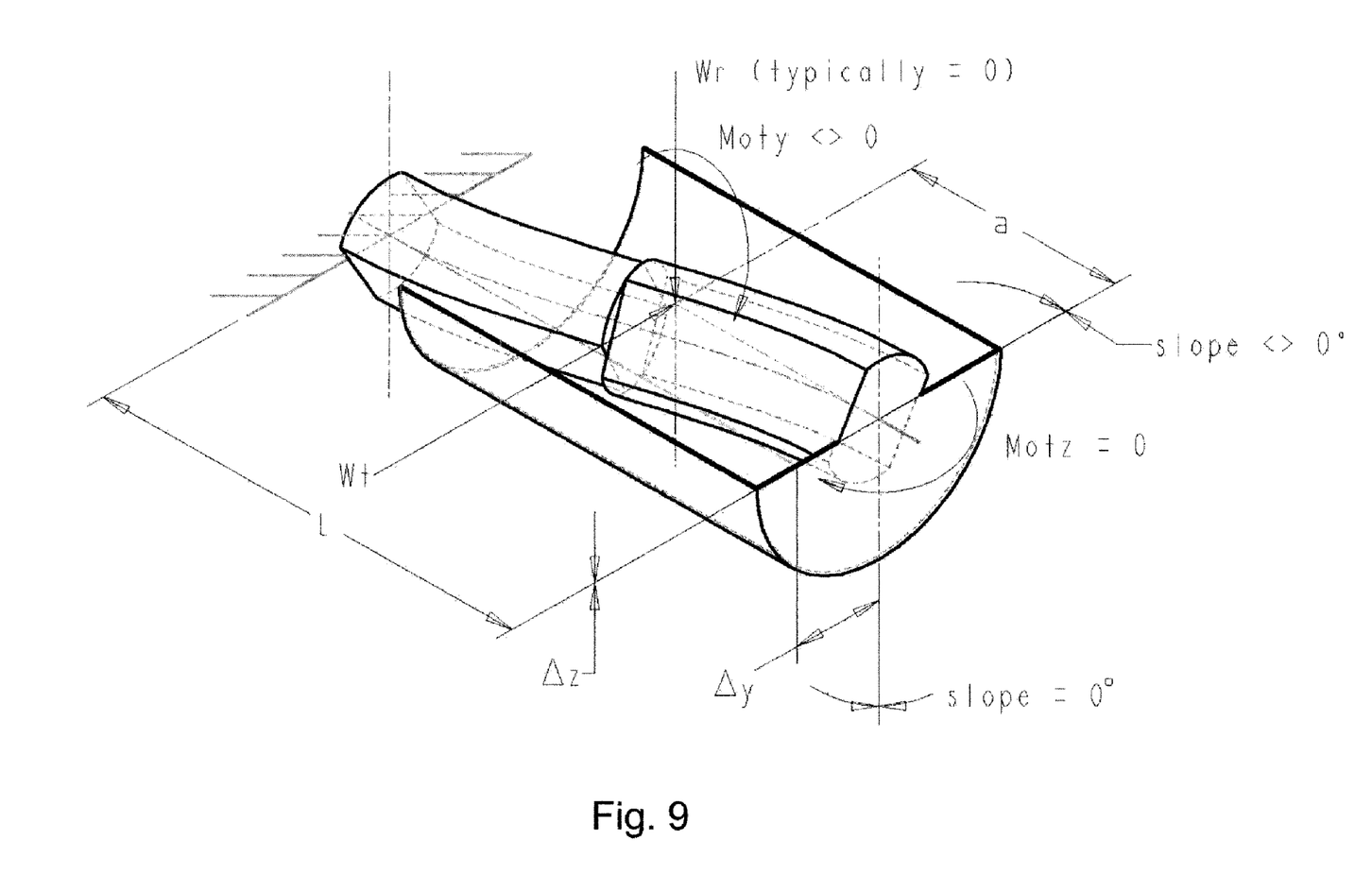
FIG. 9 is a diagram of helical gear forces on a asymmetrical flex pin with varying principal axis orientation resulting in parallel deflection

If a helix angle of 10° is added to this same gear the power capacity is now 1.23 W. Thus, the improvement in capacity is 23%. The overturning moment is counteracted by the present invention as shown in FIGS. 8 & 9. As can be seen, the asymmetrical pin design results in a deflection of the flex-pin setup with the helical gear translated parallel to the system axis and without tooth misalignment. Due to the asymmetrical shape of the pin according to the invention, there is no slope misalignment of the pin or sleeve in the y or z-direction and a displacement primarily in the y-direction, as with a spur gear.

This small change in the geometry and added cost of machining the center shaft of the flex pin is a fraction of the value of the 23% gain in gear capacity, or, the reduction of gear and pin size to handle the same power.

In addition to lower cost, the change to a helical gear has more advantages that may be even more valuable than reducing cost: reduction of vibration and noise. It is well known that helical overlaps are the most influential of geometry features in gear noise. Heretofore, flex pins were not considered for applications where the overall design required a low noise solution. With this invention, this restriction is lifted and all the inherent advantage of helical gears can be combined with flex-pin technology without adding parts to the assembly, with the risk of added wear.

Refer to FIG. 11, which is a comparison of mesh error of helical and spur gears of the same proportions. This is a dramatic comparison of similar designs, both optimized to reduce transmission error, which in the past translated to mesh vibration and noise. This is critical in many applications such as wind turbines where designers must adhere to strict noise standards.

The invention claimed is:

1. A gear unit, said gear unit comprising at least one gear stage with at least one gear that is rotatably supported on a shaft,
   said shaft being supported by a planet carrier,
   said gear being meshed with at least one other gear, and having a shaft of a flex-pin type, with a sleeve on which the gear is mounted,
   wherein said gear shaft of a flex-pin type has an asymmetric shape in at least one plane perpendicular to a system-axis in one or more locations along an axis of the shaft.

2. The gear unit according to claim 1, wherein the gear unit is of the epicyclic type, with at least one planet gear that is meshed with at least one sun gear and a fixed or rotating ring gear.

3. The gear unit according to claim 2, wherein said planet gear, said sun gear, and said ring gear are of the helical gear type.

4. The gear unit according to claim 3, wherein said gear shaft of flex-pin type has a stiffness that is non-uniform in at least one plane which is perpendicular to the system-axis.

5. The gear unit according to claim 4, wherein the non-uniform stiffness of said gear shaft of flex-pin type is used to control gear tooth mesh alignment of the planet gear to the other gear or gears with which it is meshed.

6. The gear unit according to claim 3, wherein a tangential alignment of the shaft can be adjusted by changing the angular orientation of the shaft in its carrier.

7. The gear unit according to claim 2, wherein said gear shaft of flex-pin type has a stiffness that is non-uniform in at least one plane which is perpendicular to the system-axis.

8. The gear unit according to claim 7, wherein the non-uniform stiffness of said gear shaft of flex-pin type is used to control gear tooth mesh alignment of the planet gear to the other gear or gears with which it is meshed.

9. The gear unit according to claim 2, wherein a tangential alignment of the shaft can be adjusted by changing the angular orientation of the shaft in its carrier.

10. The gear unit according to claim 1, wherein said gear shaft of flex-pin type has a stiffness that is non-uniform in at least one plane which is perpendicular to the system-axis.

11. The gear unit according to claim 10, wherein the non-uniform stiffness of said gear shaft of flex-pin type is used to control gear tooth mesh alignment of a planet gear to the other gear or gears with which it is meshed.

12. The gear unit according to claim 11, wherein a tangential alignment of the shaft can be adjusted by changing the angular orientation of the shaft in its carrier.

13. The gear unit according to claim 11 wherein the non-uniform stiffness of said gear shaft of flex-pin type is used to compensate for flexibility of the carrier to control gear tooth mesh alignment of the gear to the other gear or gears with which it is meshed.

14. The gear unit according to claim 10, wherein a tangential alignment of the shaft can be adjusted by changing the angular orientation of the shaft in its carrier.

15. The gear unit according to claim 10, wherein the non-uniform stiffness of said gear shaft of flex-pin type is used to compensate for flexibility of the carrier to control gear tooth mesh alignment of the gear to the other gear or gears with which it is meshed.

16. The gear unit according to claim 1, wherein a tangential alignment of the shaft can be adjusted by changing the angular orientation of the shaft in its carrier.

* * * * *